United States Patent [19]
Chen et al.

[11] Patent Number: 6,095,014
[45] Date of Patent: Aug. 1, 2000

[54] TRANSFER MECHANISM FOR A TURRET INDEXING AND POSITIONING SYSTEM

[75] Inventors: Young-Dar Chen, Chia Yi; Shyi-Houng Hsiao, Tai Chung Hsien; Hsiang-Feng Huang, Tai Nan, all of Taiwan

[73] Assignee: Industrial Technology Research Institute, Taiwan

[21] Appl. No.: 09/188,061

[22] Filed: Nov. 9, 1998

[51] Int. Cl.[7] .................................................. B23B 29/24
[52] U.S. Cl. .................. 74/813 C; 74/813 L; 74/813 R; 82/36 A
[58] Field of Search .............................. 74/813 C, 813 R, 74/813 L, 814–827; 82/36 A

[56] References Cited

U.S. PATENT DOCUMENTS

| | | | |
|---|---|---|---|
| 4,177,696 | 12/1979 | Moss | 74/826 |
| 4,524,655 | 6/1985 | Waldron et al. | 82/36 A |
| 4,944,198 | 7/1990 | Natale et al. | 74/813 R |
| 5,178,040 | 1/1993 | Schmidt | 74/813 L |
| 5,598,749 | 2/1997 | Goto | 74/820 |
| 5,787,767 | 8/1998 | De Bernardi | 74/813 L |
| 5,960,676 | 10/1999 | Pfeifer et al. | 74/813 C |

*Primary Examiner*—Vinh T. Luong
*Attorney, Agent, or Firm*—Bacon & Thomas

[57] ABSTRACT

A transfer mechanism for turret indexing and positioning system includes an output shaft configured to hold a turret and a hydraulically controlled three-piece tooth type shaft coupling arranged to brake the output shaft at a precise position of the turret. A follower is secured to the output shaft by a conic ring. A locking nut that can be rapidly and independently affixed is used to provide an optimal clearance between a rotational sleeve and a reference sleeve of a three-piece tooth type shaft coupling during the rotation of the turret.

10 Claims, 7 Drawing Sheets

TRANSFER MECHANISM FOR A TURRET INDEXING AND POSITIONING SYSTEM

BACKGROUND OF THE INVENTION

1. Field of the Invention

The present invention relates to a transfer mechanism for a turret indexing and positioning system, in which the transfer mechanism is separated into several modules to avoid interference among the elements during assembly, thereby reducing the assembly cost and improving stability of the turret during selection of cutters.

2. Description of the Prior Art

The automatic lathe is a widely used machine. In addition to meeting the demands of high speed, high accuracy, and smooth operation, reduction of assembly cost for mass production, maintaining its reliability and precision must be taken into consideration in the design of automatic lathes so as to improve competitive capacity in the market. This is the trend of modern lathe design.

Figure 7:
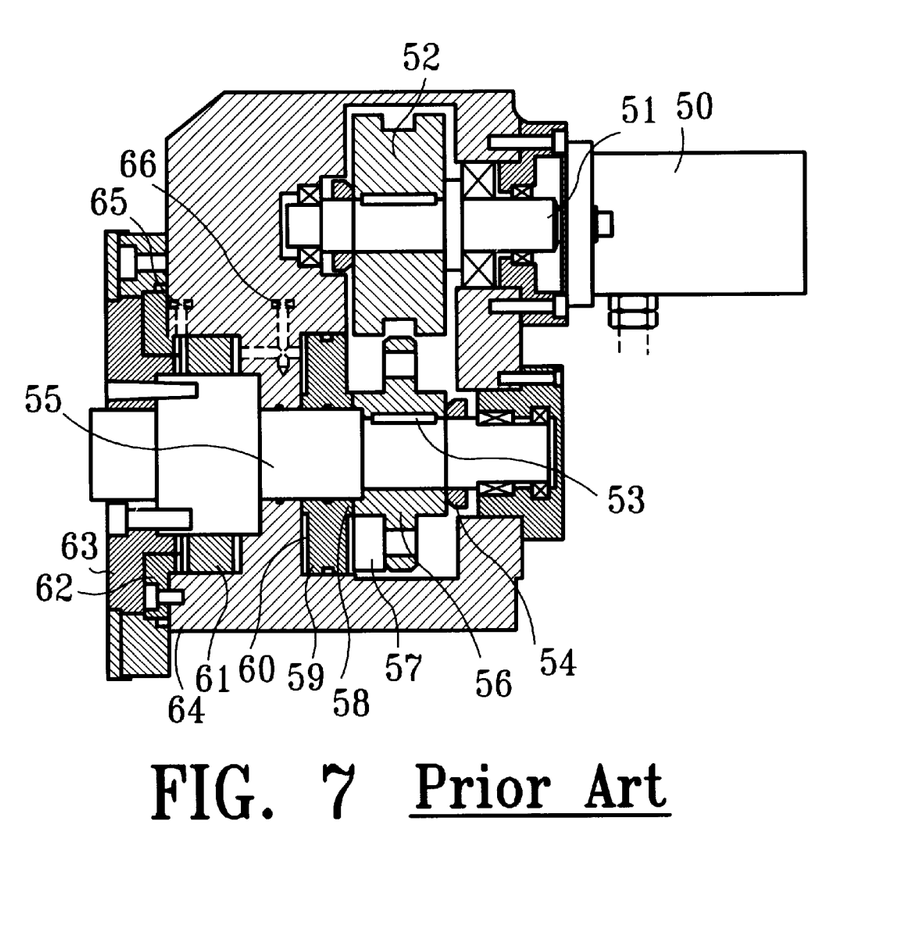
FIG. 7 is a plan view partly in section, of a conventional mechanism for a turret indexing and positioning system.

FIG. 7 of the drawings illustrates a conventional mechanism of turret index and position that already possesses the characteristics of high speed, high accuracy, smooth operation, and compactness. Yet, the production cost is still relatively high and thus adversely affects the competitive advantage in the market, as the ease of assembly is ignored.

As shown in FIG. 7, the conventional mechanism of turret indexing and positioning system includes a hydraulic motor 50 that drives a shaft 51, and a set of cam wheels 52, 56, and 57 are interconnected between the shaft 51 and an output shaft 55 to which a turret (not shown) that carries a number of cutters (not shown) is attached. A hydraulically controlled three-piece tooth-type shaft coupling 61, 62, 63 is used to instantly stop the output shaft 55 to precisely position the turret at a pre-set rotation index that corresponds to a selected cutter to be used for processing. The three-piece tooth-type shaft coupling 61, 62, and 63 initially locks the output shaft 55. When the shaft 51 is rotated, hydraulic oil enters an outer end face of a movable sleeve 61 of the three-piece tooth-type shaft coupling via an oil path 66 and makes the movable sleeve 61 to disengage from a reference sleeve 62 and a rotational sleeve 63 of the three-piece tooth-type shaft coupling. As a result, the output shaft 55 is rotatable to allow selection of the cutters on the turret. At the same time, oil enters an end face of the rotational sleeve 63 via an oil path 65 to provide a clearance between the rotational sleeve 63 and the reference sleeve 62 such that the reference sleeve 62 does not contact with the rotational sleeve 63 during rotation of the output shaft 55. When the turret reaches the desired index that corresponds to a selected cutter to be used, supply of oil is stopped to return the sleeves 61, 62, and 63 to their original positions and thus locks the output shaft 55 as well as the turret in place.

In assembly, a piston ring 59 is provided around the output shaft 55 so as to generate a clearance between the rotational sleeve 63 and the reference sleeve 62 during rotation of the turret. Hence, the piston ring 59, a bearing 58, and a follower roller disc 56 are mounted around the output shaft 55 in sequence after assembly of the sleeves 61, 62, 63, the output shaft 55, and a main body 64 that houses the elements. Then, a nut 54 is applied to secure the elements in place. In order to assure a clearance between the reference sleeve 62 and the rotational sleeve 63 during rotation of the turret, the clearance must be measured in advance, and the piston ring 59 is then moved rearwards. Assembly is proceeded after affixing an end face of the piston ring 59. This is very complicated and troublesome. In addition, the roller disc 56 must be repetitively assembled in response to the affixing procedure and the assembly procedure. As a result, the assembly is time-consuming and costly.

Furthermore, the roller disc 56 is secured to the output shaft 55 by a key 53 that might be damaged by shear forces resulting from an inertial force generated during rotation of the turret. This renders the turret to be unreliable after extended use with the automatic lathe. Moreover, the use of the nut 54 to axially secure the roller disc 56 to the output shaft 55 also requires complicated adjustment to properly position the cam 52 during assembly.

The present invention is intended to provide an improved transfer mechanism of turret index and position to solve the above mentioned problems.

SUMMARY OF THE INVENTION

A primary object of the present invention to provide a transfer mechanism for a turret indexing and positioning system that is highly efficient in design can be assembled at low cost. The transfer mechanism of turret index and position has improvements in reliability for changing cutters of the turret and for mass production, while the cost of production is reduced.

Another object of the present invention to provide a transfer mechanism for a turret indexing and positioning system and position in which the locking nut and the roller disc of the cam set are separately assembled. In addition, assembly of the locking nut can be accomplished independently and thus without interfering with the assembly of other elements. Thus, the overall assembly procedure may be efficiently simplified by providing modules for the transfer mechanism of turret index and position, thereby providing a more convenient mode for production.

It is still another object of the present invention to provide a transfer mechanism for a turret indexing and positioning system, in which the output shaft and the roller disc of the cam set are secured together by a locking nut, and the roller disc is secured in place by a conic configuration of the conic ring after adjustment in the axial position of the roller disc. The assembly and adjusting procedure of the cam set is thus simplified. In addition, the problem of damage to the key in the conventional design by shear force is avoided, thereby providing a module with higher security and reliability.

It is still another object of the present invention to provide a transfer mechanism of a turret indexing and positioning system, in which the transfer mechanism consists of separate modules. The main body may first be assembled with the three-piece tooth-type shaft coupling (including a rotational sleeve, a reference sleeve, and a movable sleeve), and the output shaft, and then with the cam set and the hydraulic motor, thereby accomplishing the overall assembly procedure. Thus, the safety is improved while the assembly procedure is greatly simplified.

The transfer mechanism for a turret indexing and positioning system having the above-mentioned advantages generally includes an output shaft that carries a turret and a hydraulically controlled three-piece tooth-type shaft coupling to brake the output shaft to thereby precisely position the turret. A follower is secured to the output shaft by at least one conic ring. A locking nut that can be rapidly and independently affixed is used to provide an optimal clearance between the rotational sleeve and the reference sleeve during rotation of the turret.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
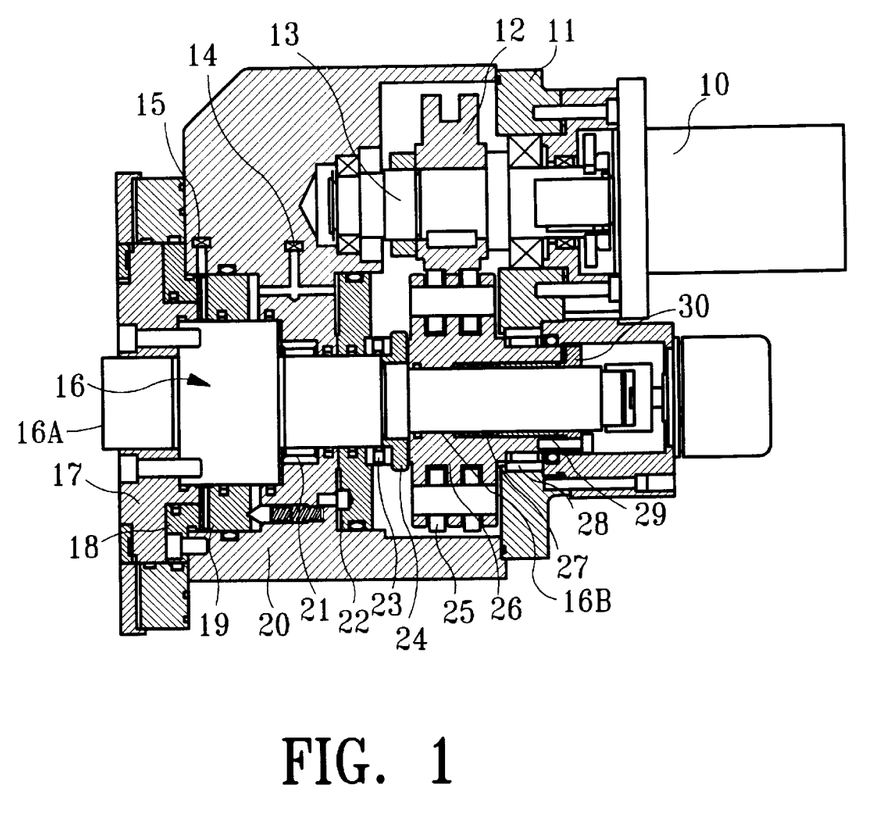
FIG. 1 is a plan view partly in section, of an embodiment of a transfer mechanism for a turret indexing and positioning system in accordance with the present invention.

Referring to the FIGS. 1 to 6 and initially to FIG. 1, a transfer mechanism for a turret indexing and positioning system in accordance with the present invention generally includes a main body 20 and a power source 10 (e.g., a hydraulic motor, hydraulic index motor, or servomotor) secured to a rear cover 11 of the main body 20. An input shaft 13 is mounted in the main body 20 and driven by the power source 10. A transmission device including a parallel conjugate cam 12 is securely mounted on the input shaft 13 and meshes with a follower (e.g., a roller disc 26) on an output shaft 16. The roller disc 26 includes a number of rollers 25 mounted to a circumference thereof. When the power source 10 operates, the output shaft 16 is driven via transmission of the parallel conjugate cam 12 and the roller disc 26. Namely, the cam set (including the roller disc 26 and the cam 12) serves as a transmission device.

The output shaft 16 has a first end portion 16A which extends beyond the main body 20, and a turret (not shown) is securely attached to a first part that connects to the first end portion 16A to rotate therewith. The turret includes a number of annularly arranged cutters (not shown) mounted thereon. When a change of the cutter for processing is required, the output shaft 16 is rotated to a certain angular position (i.e., the turret index) that corresponds to the cutter to be used, which is conventional and therefore not further described.

Still referring to FIG. 1, a three-piece tooth-type shaft coupling is mounted around the second end portion 16B of the output shaft 16 to brake the output shaft 16 and includes a hydraulically controlled three-piece tooth type shaft coupling 17, 18, 19 comprising a movable sleeve 19 mounted around the output shaft, a reference sleeve 18 secured to the main body 20, and a rotational sleeve 17 secured to the output shaft 16 to rotate therewith. A roller bearing 21 is mounted to the second end portion 16B of the output shaft 16 and located behind the three-piece tooth-type shaft coupling. A piston ring 22 and a thrust bearing 23 are mounted on the output shaft 16 and adjacent to the roller bearing 21 and axially secured by a locking nut 24. The roller disc 26 is also mounted on the second end 16B of the output shaft 16 and includes an inner receptacle (not labeled) for receiving a conic ring device 27, a separation ring 29, and a retainer ring 30 which are also mounted around the output shaft 16. The retaining ring 30 is secured on the output shaft 16 and applies an axial thrust to and thus retains the conic ring device 27 via transmission of the separation ring 29. Thus, the roller disc 26 and the output shaft 16 are secured together. A further bearing 28 is mounted on the roller disc 26. As a result, the bearing 28 and the roller bearing 21 together support this mechanism.

The output shaft 16 is braked by the three-piece tooth-type shaft coupling. When a change or selection of the cutter is required, the power source 10 is operated, hydraulic oil enters an end face of the movable sleeve 19 via an oil path 14 and thus makes the movable sleeve 19 disengage from the reference sleeve 18 and the rotational sleeve 17 along an interface 14A, thereby allowing rotational movement of the output shaft 16. At the same time, hydraulic oil also enters an end face of the rotational sleeve 17 via an oil path 15 to generate a clearance 65A between the rotational sleeve 17 and the reference sleeve 18. As a result, the reference sleeve 18 does not contact with the rotational sleeve 17 during rotation of the output shaft 16. Such a clearance is decided by affixing of an end face of the locking nut 24 during assembly.

Figure 2:
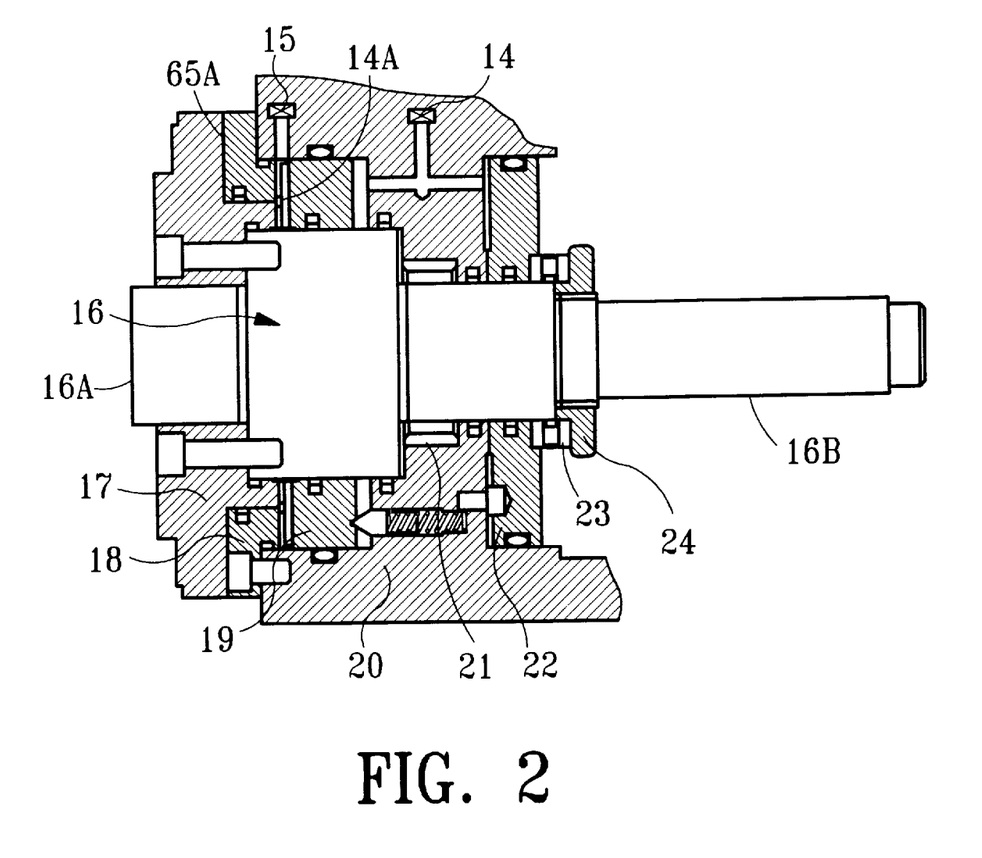
FIG. 2 is an enlarged view of a three-piece tooth-type shaft coupling of the transfer mechanism for a turret indexing and positioning system of FIG. 1.

Assembly of the transfer mechanism for a turret indexing and positioning system of the present invention can be achieved by separate modules. Referring to FIG. 2, an initial clearance between the rotational sleeve 17 and the reference sleeve 18 of the three-piece tooth-type shaft coupling is measured, and the axial positions thereof are locked in place by directly affixing the locking nut 24 to provide an optimal clearance between the rotational sleeve 17 and the reference sleeve 18. This procedure can be accomplished independent from and thus shall not adversely affect assembly procedure of the other elements. Thus, an efficient module assembly procedure is obtained to provide a best design for the transfer mechanism.

Figure 3:
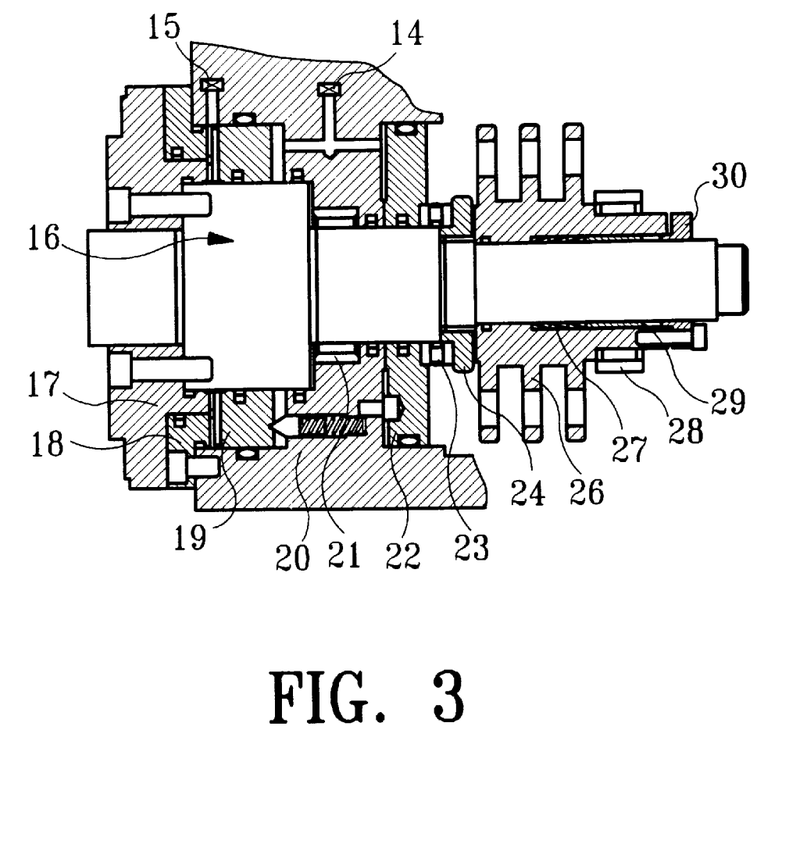
FIG. 3 is a view similar to FIG. 2, wherein a follower has been assembled to an output shaft of the transfer mechanism for a turret indexing and positioning system.
Figure 4:
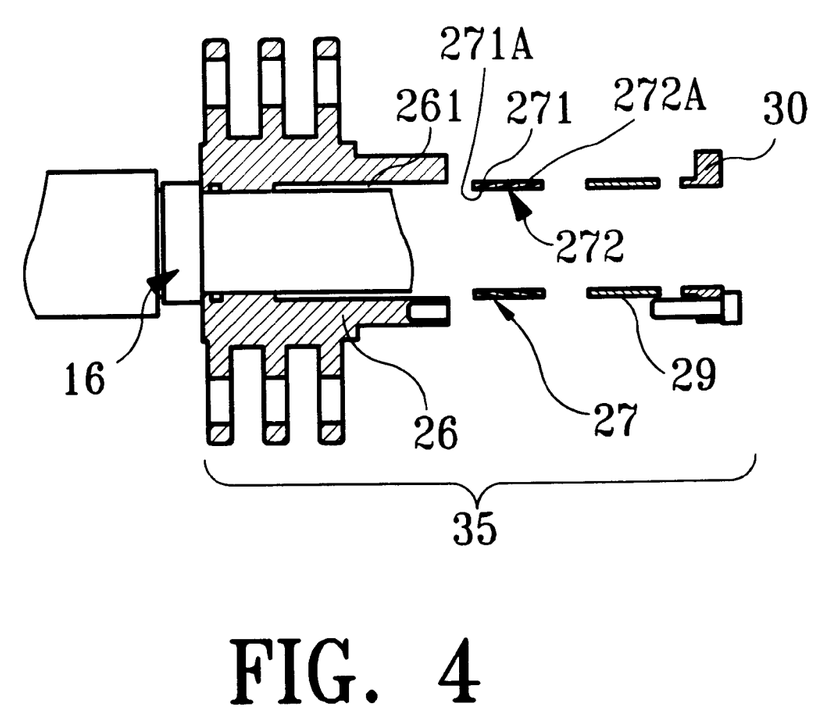
FIG. 4 is an exploded view illustrating the assembly of the follower to the output shaft of FIG. 1.

Referring to FIGS. 3 and 4, the roller disc 26 and the output shaft 16 are secured together by the conic ring device 27. The conic configuration of the conic ring device 27 allows the retainer ring 30 to apply to a force to the separation ring 29 and pushes the conic ring device 27 to thereby immediately secure the output shaft 16 and the roller disc 26 together and securely retain the roller disc 26 in an axial position after fine adjustment in the axial position of the roller disc 26. Thus, assembly procedure of the cam set is simplified. In addition, the damage of the key 53 in the conventional design is avoided. Accordingly, the module has a longer service life and greater reliability.

FIG. 4 shows a follower and output shaft assembly 35. The conic ring device 27 includes a first conic ring 271 and a second conic ring 272 that are engaged with each other by conic surfaces. The first conic ring 271 includes an inner conic surface 271A that tapers gradually and a planar outer surface and is securely received in an axial spacing 261 of the roller disc 26. The second conic ring 272 includes an outer conic surface 272A that tapers gradually and a planar inner surface and is securely mounted on the output shaft 16. The first conic ring 271 and the second conic ring 272 bear against each other and thus generate a radial clamping force to securely retain the output shaft 16 in its axial position.

Figure 5:
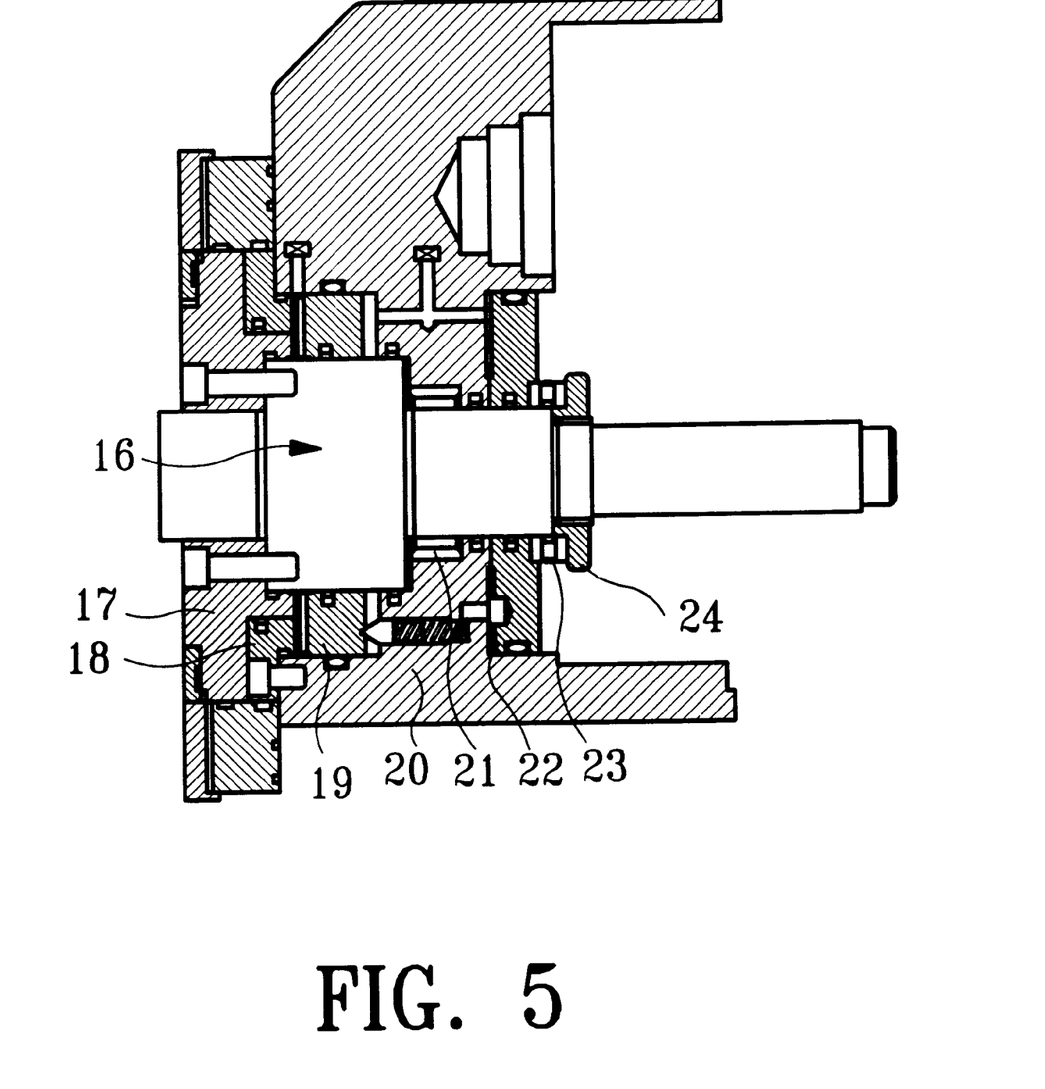
FIG. 5 is a plan view partly in section of a first module of the transfer mechanism for a turret indexing and positioning system in accordance with the present invention.
Figure 6:
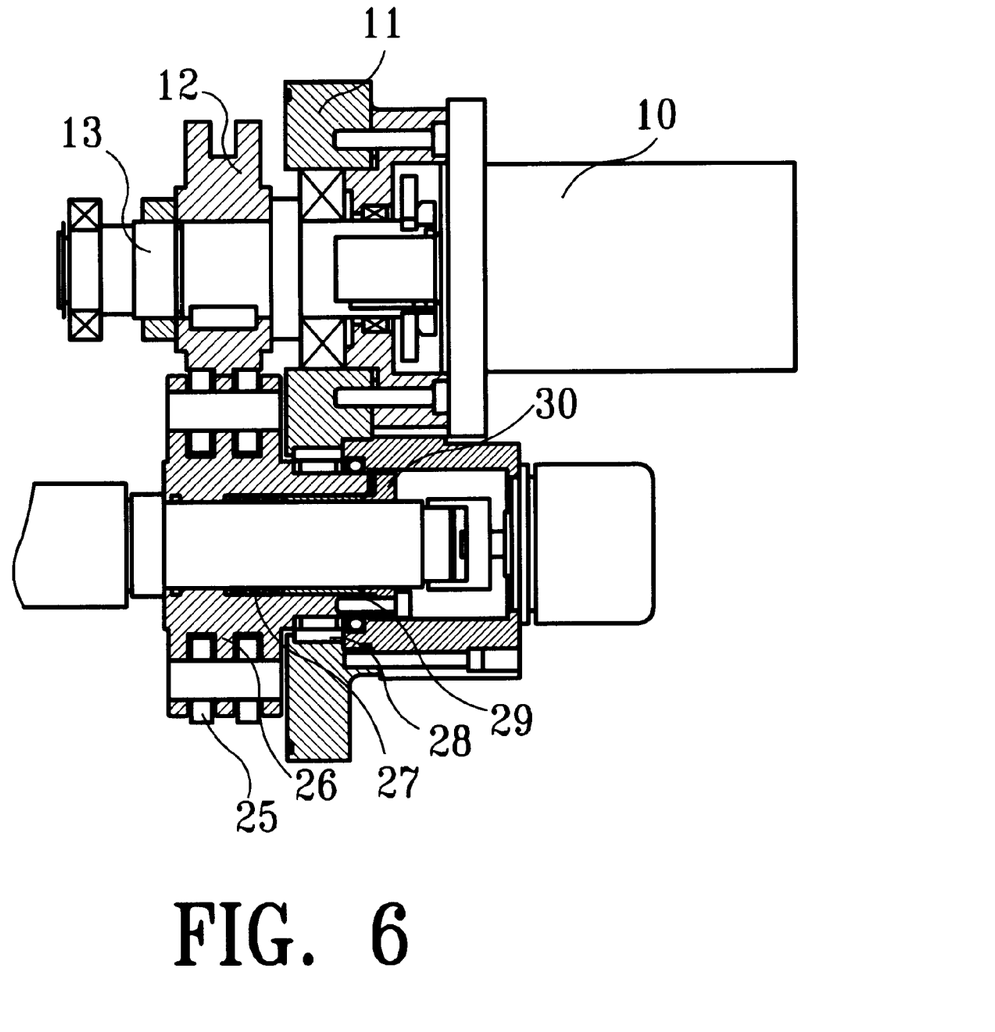
FIG. 6 is a plan view partly in section, of a second module of transfer mechanism for a turret indexing and positioning system in accordance with the present invention.

Referring to FIGS. 5 and 6, the main body 20 is separated to meet the requirement of separate modules. Namely, the main body 20 is separated into two parts. Assembly of the module in FIG. 5 is accomplished before assembly with the module in FIG. 6. Namely, the output shaft 16, the three-piece tooth-type shaft coupling 17, 18, 19, the roller bearing 21, the piston ring 22, the thrust bearing 23, and the locking nut 24 are assembled in a first part of the main body 20 to obtain a first module shown in FIG. 5. Then, the power source 10, the parallel conjugate cam 12, the input shaft 13, the roller disc 26, the conic ring device 27, the separation ring 29, and the retainer ring 30 are assembled in the second part (the rear cover 11) of the main body 20 to obtain a second module shown in FIG. 6. The two modules may be easily assembled without any troublesome assembly sequence. Thus, a better assembly efficiency is obtained and the assembly cost is reduced with a higher reliability.

According to the above description, the transfer mechanism for a turret indexing and positioning system has the following advantages:

1. The transfer mechanism for a turret indexing and positioning system is improved in reliability and safety, while the cost is reduced in mass production and thus has improved competitive capacity.
2. The design of modules for the transfer mechanism for a turret indexing and positioning system allows rapid, easy assembly for mass production, thereby reducing the assembly cost and production time.
3. The locking nut, the piston ring, and the bearing are directly secured in place, while the roller disc can be assembled separately, thereby improving the assembly procedure.
4. The roller disc is secured in position by the conic ring device, the separation ring, and the retaining ring to improve reliability and security for the engagement between the roller disc and the output shaft. In addition, such an assembly procedure can be accomplished after adjustment of the roller disc in the axial position thereof, thereby providing convenience to assembly.
5. The conic configuration of the conic ring device allows the roller disc to be secured in place after adjustment in the axial position. As a result, the assembly and adjustment procedure for the transfer mechanism of turret index and position is simplified. Also, the problem of damage to the key in the conventional design by shear force is avoided, thereby providing a longer service life period and higher security.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

What is claimed is:

1. A transfer mechanism for a turret indexing and positioning system, comprising:
    a main body;
    a power source;
    an input shaft mounted in the main body and driven by the power source;
    an output shaft having first and second end portions, the first end portion extends beyond the main body and is configured for connecting a first end part which mounts on a turret, the second end portion is arranged within the main body;
    a transmission device mounted in the main body and configured for transmitting power from the input shaft to the output shaft, the transmission device includes a follower mounted on the second portion of the output shaft and at least one conic ring device mounted on the second portion of the output shaft to secure the follower on the output shaft while permitting fine adjustment of the follower in an axial direction relative to the length of the output shaft;
    a hydraulically controlled three-piece tooth type shaft coupling configured for braking a turret attached to a first part which is attached to the output shaft;
    a piston ring and a thrust bearing mounted on the output shaft and positioned around the output shaft and adjacent to the piston ring;
    a locking nut configured to be mounted on the output shaft to axially position the piston ring in place, the locking nut is assembled independently of the follower; and
    wherein as the input shaft is rotated, hydraulic oil enters an interface between the three-piece tooth type shaft coupling and the piston ring to generate a clearance in the three-piece tooth type shaft coupling in order to release the output shaft and allow rotational movement of the output shaft.

2. The transfer mechanism for a turret indexing and positioning system as recited in claim 1, wherein the main body includes first and second modules that are separate from each other, the first module comprising the assembly of the output shaft, the three-piece tooth-type shaft coupling, the thrust bearing, and the locking nut, and the second module comprising the assembly of the power source, the input shaft, and the transmission device, the first and second modules assembled together to form the transfer mechanism.

3. The transfer mechanism for a turret indexing and positioning system as recited in claim 1, wherein the transmission device further includes a roller disc, an axial spacing is formed between the roller disc and the output shaft, the conic ring device includes first and second conic rings, the rings are engaged with each other on conic surfaces thereof, the first conic ring is securely received in the axial spacing and include an inner conic surface that tapers gradually and a planar outer surface, the second conic ring is mounted on the output shaft and includes an outer conic surface that tapers gradually and a planar inner surface, the first and the second conic rings bear against each other to generate a radial clamping force to securely retain the output shaft in the axial position.

4. The transfer mechanism for a turret indexing and positioning system as recited in claim 1, further comprising a retainer ring mounted on the output shaft that exerts thrust to retain the conic ring device between the follower and the output shaft.

5. The transfer mechanism for a turret indexing and positioning system as recited in claim 4, further comprising a separation ring mounted between the conic ring device and the retainer ring, the separation ring configured to finely adjust the axial position of the follower and transmit axial thrust from the retainer ring.

6. The transfer mechanism for a turret indexing and positioning system as recited in claim 1, wherein the follower is a disc.

7. The transfer mechanism for a turret indexing and positioning system as recited in claim 6, wherein the transmission device further includes a parallel conjugate cam securely mounted on the input shaft and meshed to the roller disc.

8. The transfer mechanism for a turret indexing and positioning system as recited in claim 1, wherein the power source is a hydraulic motor.

9. The transfer mechanism for a turret indexing and positioning system as recited in claim 1, wherein the power source is a hydraulic index motor.

10. The transfer mechanism for a turret indexing and positioning system as recited in claim 1, wherein the power source is a servomotor.

* * * * *